US008640121B2

(12) United States Patent
Barr et al.

(10) Patent No.: US 8,640,121 B2
(45) Date of Patent: Jan. 28, 2014

(54) FACILITATING MULTI-INSTALLER PRODUCT INSTALLATIONS

(75) Inventors: Paul C. Barr, Redmond, WA (US); Nnaemeka M. C. Nduaguba, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 1314 days.

(21) Appl. No.: 11/623,191

(22) Filed: Jan. 15, 2007

(65) Prior Publication Data
US 2008/0172664 A1  Jul. 17, 2008

(51) Int. Cl.
*G06F 9/445* (2006.01)

(52) U.S. Cl.
USPC .......................................................... 717/174

(58) Field of Classification Search
USPC .................................. 717/174–178
See application file for complete search history.

(56) References Cited

U.S. PATENT DOCUMENTS

| | | | | |
|---|---|---|---|---|
| 5,247,683 | A | 9/1993 | Holmes et al. ............... | 395/700 |
| 6,075,943 | A | 6/2000 | Feinman ....................... | 395/712 |
| 6,131,192 | A | 10/2000 | Henry ............................ | 717/11 |
| 6,269,377 | B1 | 7/2001 | Collie et al. | |
| 6,279,154 | B1 * | 8/2001 | Davis ........................... | 717/174 |
| 6,282,709 | B1 | 8/2001 | Reha et al. | |
| 6,289,512 | B1 | 9/2001 | Edwards et al. ............... | 717/11 |
| 6,301,708 | B1 | 10/2001 | Gazdik et al. .................. | 717/11 |
| 6,327,705 | B1 | 12/2001 | Larsson et al. | |
| 6,345,386 | B1 * | 2/2002 | Delo et al. .................... | 717/176 |
| 6,378,127 | B1 | 4/2002 | Delo | |
| 6,385,766 | B1 | 5/2002 | Doran, Jr. et al. ............. | 717/11 |
| 6,401,241 | B1 | 6/2002 | Taylor .......................... | 717/174 |
| 6,408,434 | B1 | 6/2002 | Fujiwara | |
| 6,418,554 | B1 | 7/2002 | Delo et al. | |
| 6,427,227 | B1 | 7/2002 | Chamberlain | |
| 6,493,871 | B1 | 12/2002 | McGuire et al. | |
| 6,604,237 | B1 | 8/2003 | Giammaria | |

(Continued)

FOREIGN PATENT DOCUMENTS

| | | |
|---|---|---|
| EP | 1 594 055 A1 | 9/2005 |
| GB | 2 416 046 A | 11/2006 |
| WO | WO 2007/133347 | 11/2007 |

OTHER PUBLICATIONS

"Impersonate a client after authentication" published Jan. 21, 2005. Http://msdn.microsoft.com/en-us/library/cc787897.aspx.*

(Continued)

*Primary Examiner* — Anna Deng
(74) *Attorney, Agent, or Firm* — Merchant & Gould (57) ABSTRACT

Methods, computer program products, and systems facilitate installation of a multi-installer program. A method involves executing a custom action holding an installer mutex associated with installing a core installation via a core installer of a multi-installer program, spawning from within the custom action a spawned custom action capable of awaiting execution until the custom action no longer holds the installer mutex, and executing the spawned custom action to confirm when installation conditions are met for implementing an add-on installation associated with an add-on installer of the multi-installer program. The method may also involve confirming to a target user that the installation conditions are met. When the installation conditions are met, multiple installation actions can be implemented sequentially. The installation conditions may include the installer mutex no longer being held but available for use, completion of core installation, and an installer service being available to complete the add-on installation.

18 Claims, 5 Drawing Sheets

(56) References Cited

U.S. PATENT DOCUMENTS

| | | | |
|---|---|---|---|
| 6,675,382 B1 | 1/2004 | Foster | 717/177 |
| 6,735,766 B1 | 5/2004 | Chamberlain | |
| 6,966,060 B1 | 11/2005 | Young | |
| 6,973,647 B2 | 12/2005 | Crudele et al. | |
| 7,047,529 B2 | 5/2006 | Delo | 717/174 |
| 7,073,172 B2 | 7/2006 | Chamberlain | 717/169 |
| 7,107,588 B2 | 9/2006 | Gentry | 717/176 |
| 7,802,246 B1 | 9/2010 | Kennedy et al. | |
| 2002/0059425 A1 | 5/2002 | Belfiore | |
| 2002/0087876 A1 | 7/2002 | Larose | 713/200 |
| 2002/0095671 A1 | 7/2002 | Delo et al. | |
| 2003/0005166 A1 | 1/2003 | Seidman | |
| 2003/0009752 A1 | 1/2003 | Gupta | 717/171 |
| 2003/0037326 A1 | 2/2003 | Burkhardt et al. | |
| 2003/0037327 A1 | 2/2003 | Cicciarelli et al. | 717/178 |
| 2003/0046680 A1 | 3/2003 | Gentry | |
| 2003/0084439 A1 | 5/2003 | Perkins et al. | |
| 2003/0145317 A1 | 7/2003 | Chamberlain | |
| 2003/0208685 A1 | 11/2003 | Abdel-Rahman | 713/191 |
| 2003/0225851 A1 | 12/2003 | Fanshier et al. | |
| 2003/0233483 A1* | 12/2003 | Melchione et al. | 709/310 |
| 2004/0098706 A1 | 5/2004 | Khan et al. | |
| 2004/0143830 A1 | 7/2004 | Gupton et al. | |
| 2004/0169686 A1 | 9/2004 | Zimniewicz et al. | |
| 2004/0177355 A1 | 9/2004 | Wragge | |
| 2004/0210893 A1 | 10/2004 | Chamberlain et al. | |
| 2004/0243994 A1 | 12/2004 | Nasu | |
| 2004/0249919 A1 | 12/2004 | Mattheis | |
| 2004/0255291 A1 | 12/2004 | Sierer et al. | |
| 2004/0261053 A1 | 12/2004 | Dougherty et al. | |
| 2005/0010547 A1 | 1/2005 | Carinci et al. | |
| 2005/0108704 A1 | 5/2005 | Marinelli et al. | |
| 2005/0120106 A1 | 6/2005 | Alberto | |
| 2005/0172283 A1* | 8/2005 | Delo | 717/174 |
| 2005/0204356 A1 | 9/2005 | Sandarajan et al. | |
| 2005/0216906 A1 | 9/2005 | Shahindoust et al. | |
| 2005/0262076 A1 | 11/2005 | Voskuil | |
| 2005/0289538 A1 | 12/2005 | Black-Ziegelbein et al. | |
| 2006/0010435 A1 | 1/2006 | Jhanwar et al. | |
| 2006/0041572 A1 | 2/2006 | Maruyama | |
| 2006/0048134 A1* | 3/2006 | Napier et al. | 717/169 |
| 2006/0048136 A1* | 3/2006 | Vries et al. | 717/174 |
| 2006/0080656 A1 | 4/2006 | Cain et al. | |
| 2006/0161915 A1 | 7/2006 | Barr et al. | |
| 2006/0174223 A1* | 8/2006 | Muir et al. | 717/106 |
| 2006/0230397 A1 | 10/2006 | Cook et al. | 717/174 |
| 2006/0232663 A1 | 10/2006 | Gandhi et al. | |
| 2006/0265706 A1* | 11/2006 | Isaacson et al. | 717/174 |
| 2007/0055766 A1* | 3/2007 | Petropoulakis et al. | 709/224 |
| 2007/0256068 A1 | 11/2007 | Barr et al. | |
| 2007/0256072 A1 | 11/2007 | Barr et al. | |
| 2008/0028389 A1* | 1/2008 | Genty et al. | 717/174 |
| 2008/0172736 A1 | 7/2008 | Barr et al. | |

OTHER PUBLICATIONS

How To: Use Windows Authentication in ASP.NET 2.0: published Aug. 2005 by J.D. Meier, Alex Machman, Blaine Wastell, Prashant Bansode, Andy Wigley, Kishore Gopalan. Http://msdn.microsoft.com/en-us/library/ff647405.aspx.*

Tobias Oetiker et al., "SEPP—Software Installation and Sharing System," originally published in the Proceedings of the Twelfth Systems Administration Conference (LISA '98), Boston, Massachusetts, Dec. 6-11, 1998, http:/www.usenix.org/event/lisa98/full_papers/oetiker2/oetiker2.pdf.

Simon George et al., "Automated Software Packaging and Installation for the ATLAS Experiment,"http://www.pp.rhul.ac.uk/hep/pubs2/2003/_grid03-09.pdf.

Quick Tour of WinINSTALL 7.5, QT18: Advertising Software for Installation, Jul. 2003, pp. 1-8, http://ondemandsoftware.com/qts/guides/QuickTours/Quick Tours/QT18_DistSW_Advertising.doc.

Using InstallAware 6 to Deploy Microsoft.Net Framework Applications, Jun. 2006, pp. 1-27, http://www.installaware.com/installaware_deploy_dotnet.pdf.

V. N. Venkatakrishnan et al. "An Approach for Secure Software Installation," Computer Science Department, Suny at Stony Brook, pp. 219-226 of the Proceedings of LISA '02: Sixteenth Systems Administration Conference (Berkeley, CA USENIX Association, 2002), http://www.usenix.org/events/lisa02/tech/full_papers/venkatakrishnan/venkatakrishnan.pdf.

Kenneth Manheimer et al., "The Depot: A Framework for Sharing Software Installation Across Organizational and UNIX Platform Boundaries," LISA IV, Oct. 17-19, 1990, Colorado Springs, Colorado, pp. 37-46, http://citeseer.ist.psu.edu/cache/papers/cs/3989/ftp:zSzzSzftp.stna.dgac.frzSzpubzSzsystemzSzadminzSzdepotzSzlisa-paper.pdf/manheimer90depot.pdf.

CN Office Action, dated Jun. 10, 2010, mailed in Application No. 200780015940.6.

U.S. Office Action dated Jan. 10, 2011, in U.S. Appl. No. 11/414.998.

"How to: Use Windows Authentication in ASP.NET 2.0"; published Aug. 2005 by J.D. Meier, Alex Machman, Blaine Wastell, Prashant Bansode, Andy Wigley, Kishore Gopalan; http://msdn.microsoft.com/en-us/library/ff647405.aspx; 10 pgs.

"Impersonate a client after authentication"; published Jan. 21, 2005; http://msdn.microsoft.com/en-us/library/cc787897.aspx; 2 pgs.

"Waiting to Install"; published Jan. 23, 2006 by Heath Stewart; http://blogs.msdn.com/b/heaths/archive/2006/01/23/516454.aspx; 4 pgs.

U.S. Office Action dated Mar. 15, 2011, in U.S. Appl. No. 11/623,182, pp. 1-39.

U.S. Official Action dated Aug. 16, 2010 in U.S. Appl. No. 11/415,329, pp. 1-25.

Coupaye, T. et al., "Foundations of enterprise software deployment", Software Maintenance and Reengineering, 2000. Proceedings of the Fourth European Feb. 29-Mar. 3, 2000, pp. 65-73. http://ieeexplore.ieee.org/search/wrapper.jsp?arnumber=827313.

DameWare MSI, "Windows Installer Options for Dameware MSI Files", Nov. 10, 2004, pp. 1-4 <Dameware_MSI_04.pdf>; 3 pgs.

Dillinger, M. et al., "Decentralized software distribution for SDR terminals", Apr. 2002, IEEE, vol. 9, Issue 2, pp. 20-25.

Dolstra, E. et al., "Imposing a memory management discipline on software deployment", Proceedings 26th Intn'l Conference on May 23-28, 2004. pp. 583-592. http://ieeexplore.ieee.org//search/wrapper.jsp?arnumber=1317480.

Koivunen, Erka et al., "Policy Management in Windows NT", Original Version Nov. 29, 1999, Revised Jan. 10, 2000, 21 pgs., http://www.tml.tkk.fi.Opinnot/Tik-110.501/1999/papers/policynt/policynt.html.

Sahin, I. et al., "Policy analysis for warranty, maintenance, and upgrade of software systems", Journal of Software Maintenance and Evolution: Research and Practice, vol. 13, Issue 6, pp. 469-493, published online Dec. 13, 2001. http://www3.interscience.wiley.com/cgi-bin/abstract/8513464/Abstract.

International Search Report dated Sep. 14, 2007, Application No. PCT/US2007/008257, 7 pages.

U.S. Official Action dated Jul. 8, 2010 in U.S. Appl. No. 11/414,998, 17 pages.

U.S. Official Action dated Aug. 16, 2010 in U.S. Appl. No. 11/415,329, 25 pages.

U.S. Office Action dated Jul. 7, 2011, in U.S. Appl. No. 11/414,998,18 pages.

U.S. Office Action dated Oct. 13, 2011, in U.S. Appl. No. 11/623,182, 35 pages.

U.S. Office Action dated Jan. 25, 2012, in U.S. Appl. No. 11/414,998, 22 pages.

U.S. Office Action dated Oct. 13, 2011, in U.S. Appl. No. 11/623,182, filed Jan. 15, 2007, Applicant name: Barr et al., 35 pages.

U.S. Office Action dated Jun. 19, 2012 in U.S. Appl. No. 11/623,182, 42 pages.

U.S. Office Action dated Nov. 21, 2012 in U.S. Appl. No. 11/623,182, 41 pages.

U.S. Office Action mailed May 7, 2013 in U.S. Appl. No. 11/623,182, 43 pages.

EP Communication mailed Sep. 6, 2009, cited in Application No. 07 754 734.7, pp. 1-6.

European Search Report dated Sep. 14, 2007, Application No. PCT/US2007/008257, pp. 1-7.

(56) References Cited

OTHER PUBLICATIONS

European Search Report dated Apr. 6, 2009, Application No. PCT/US2007/008257, pp. 1-8.

Office Action mailed Jul. 8, 2010, cited in U.S. Appl. No. 11/414,998, pp. 1-17.

* cited by examiner

FACILITATING MULTI-INSTALLER PRODUCT INSTALLATIONS

BACKGROUND

Many small to medium sized business organizations have a network infrastructure to allow software product distribution by a network administrator. Software products may be installed on the client by the network administrator by manually installing the program on each client. Such installation is very time consuming and tedious. A network administrator may also use a software deployment technology to advertise available software for download to a client. Such deployment comes from a central server and is less time consuming than manual installation because software products may be advertised to a plurality of clients at one time.

Some operating systems have support for installing software products which are packaged in a single product installer format. Single product installers facilitate the installation of the software product on a client via a software deployment technology. In such a situation, the single product installer bundles both the application binaries and application specific resources. Thus, many software deployment technologies only deploy a single product installer to a client during software distribution. An operating system may natively support installing these single product installer software packages to computers which are joined to, for example, a managed Active Directory Domain. This technology is called Group Policy Software Installation (GPSI).

Software products may also be programmed with multiple product installers. In such a situation, one product installer may include the application binaries and multiple other installers may include the application specific resources. Due to limitations in GPSI and/or conventional installer technologies, software products which are composed of more than a single installer file can not be installed appropriately to a target computer. Specifically, with these conventional installer technologies only one installer can be executed with permissions per deployment, and only one installer process can perform installation actions at a time. In the past, software deployment technologies that can only deploy a single product installer could not facilitate installation of software products that are programmed with multiple product installers.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

A custom action is associated with a core installer to leverage the privileges of the core installer to facilitate installation of satellite installers on a client device. The custom action allows multi-installer software products to be installed on a client or target computer via a software deployment technology configured for single installer software products. In this manner, multi-installer software products may be easily deployed and installed on client devices.

According to embodiments of the invention, installation of multi-installer software products is facilitated by a method of spawning a process from within an installer custom action. The spawned process is capable of waiting until the installer custom action from which it was spawned no longer holds an installer mutex and thus, works around the single instance nature of conventional installers.

Embodiments of the invention also involve a method of having the spawned process begin action only after detecting the existence of specific metadata persisted to a target computer. This metadata indicates that the original installation process has completed and that subsequent installation actions can begin.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented to many different forms and should not be construed as limited to the embodiments set forth herein, rather, these embodiments are provided so that this disclosure will be thorough and complete, and will fully convey the scope. Embodiments may be practiced as methods, systems, computer program products, or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps of modules.

In a small to medium sized business organization, software products are installed on client machines in many different ways. When a user has administrative rights to a client device, the user may download software products from the Internet or install a software product from a computer readable medium. Such rights are rarely issued to a user in a typical business setting because the business organization desires maintaining control over the software that the user has on the client device. For these reasons, many business organizations have restricted privileges on client devices. These restricted privileges may prohibit installation of software products.

In such situations, a network administrator may have the responsibility of maintaining and installing software on client devices. To install software products on a client device, the network administrator may be required to manually install the software on each client device. The network administrator logs onto the client device with heightened or elevated privileges. The network administrator may then install the software product onto the client device. Installing software products in this manner may be acceptable in business organizations with a small number of client devices. However, as the number of client devices increase, so does the time and labor required to install software products on each of the client devices.

When a network administrator desires installing a software product on several devices, the network structure of the business organization may allow the network administrator to utilize a software deployment technology to remotely install software on the client devices. A software deployment technology may facilitate the installation of a software product having a single installer. A single installer software product is a software product that includes both the application binaries and the application specific resources bundled into a single installer. The software deployment technology advertises the single installer of the software product on the client device. When an install action is instigated, the software product is installed on the client device.

Some software products may also include multiple installers. In such a situation, the software product may include a core installer that is associated with the application binary. The software may also include satellite or add-on installers that are associated with application resources. Multi-installer software products may present problems for software deployment technologies that are configured to only install software products that have a single installer, because such software deployment technologies only recognize one installer.

A properly configured custom action allows a software product with multiple installers to be installed using such a software deployment technology. A custom action is associated with the core installer of the software product. The software deployment technology advertises the core installer on the client device. When an install action is instigated, the custom action associated with the core installer is executed. The source of the core installer is identified and the source is scanned to determine whether satellite installers are associated with the software product. If satellite installers are associated with the product, the custom action schedules and spawns other custom actions to impersonate a target client user or machine account in order to access script associated with the satellite installers and advertise the satellite installers on the client for facilitating installation. Upon completing the installation associated with the core installer and advertising the satellite installers, sequencing of subsequent installation(s) associated with the satellite installers may be facilitated by embodiments of the invention.

Succinctly stated, the custom action associated with the core installer leverages the privileges of the core installer to install satellite installers on a client device, for example when the client device has restricted privileges for users. The custom action allows multi-installer software products to be advertised and sequentially installed on a client via a software deployment technology configured for single installer software products. In this manner, multi-installer software products may be easily deployed, advertised and installed on client devices. This invention would enable a product composed of more than one installer file to be installed on a target computer by engineering around the limitations of conventional installers.

The custom action works for both lockdown and non-lockdown sessions. There are two modes of deployment, (1) per-machine, (2) per-user. In a per-machine mode, a machine credential is used in the installation, and the product is installed for all users. The machine credential account is a "super-user" account. In contrast, a current user's credential is used in a per-user mode. A "lockdown" scenario or mode refers to a logon-session initiated by a user that does not have the administrator privileges. Thus, in the context of per-user and per-machine modes of deployment, the custom actions involved can be grouped into three sets: (1) per-user specific, (2) per-machine specific, and (3) per-user/per-machine agnostic.

Figure 1:
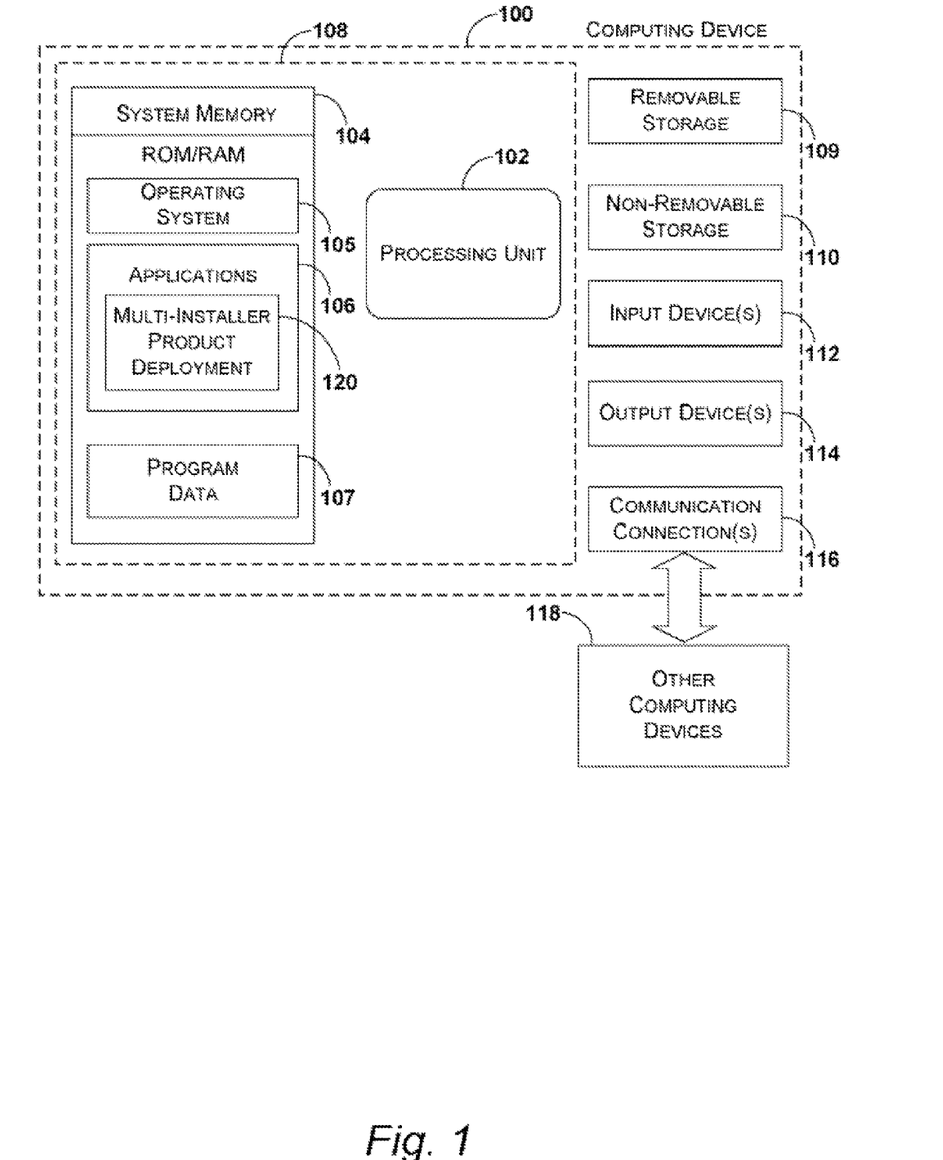
FIG. 1 illustrates an exemplary computing apparatus or device.
Figure 2:
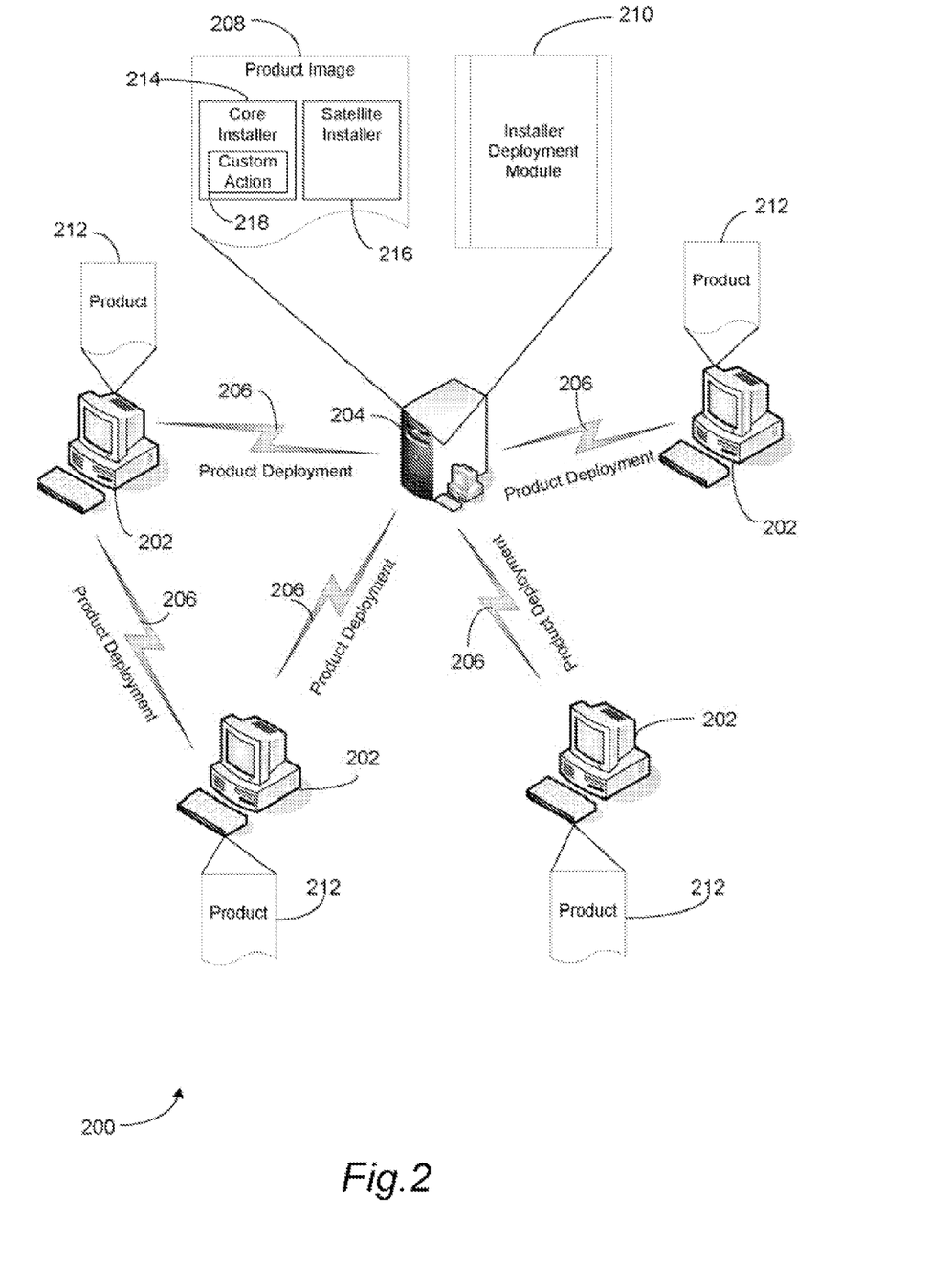
FIG. 2 represents one exemplary environment for deploying a software product via a network.

FIG. 2 represents one exemplary environment for deploying a multi-installer software product in a network. System 200 represents a modular overview of a computing environment. System 200 may include computing device 202. Computing device 202 may include a desktop computing device, mobile computing device, a laptop, a personal digital assistant, a notebook computer, and/or any other type of computing device functional to store data. In one aspect, computing device 202 includes computing device 100 as exemplified in FIG. 1.

System 200 also includes server 204. Server 204 may be associated with an administrator terminal. Server 204 may include any type of server that facilitates product deployment in a networked environment. Server 204 is in communication with computing device 202 via network connection 206. Network connection 206 may include a hardwired network connection and/or a wireless network connection. Network connection 206 may include any type of network connection functional to transmit data between a computing device and a server or between computing devices. Network connection 206 includes any type of network connection that facilitates product deployment.

In the distributed environment, server 204 and/or client 202 may include product image 208 and installer deployment module 210. For example, an administrator may associate product image 208 with server 204 to facilitate product deployment to client 202. Client 202 may install product 212 on client 202. It should also be appreciated that product image 208 may be associated with a file share or one client 202 to facilitate product deployment to another client 202.

In one embodiment, product 212 is a multi-installer product, such as, a "MICROSOFT OFFICE" product of MICROSOFT CORPORATION headquarters in Redmond, Wash. In such a situation, product image 208 includes core installer 214 and satellite installer(s) 216. In another embodiment, installer deployment module 210 is a single installer deployment module, such as "MICROSOFT ACTIVE DIRECTORY" of MICROSOFT CORPORATION headquarters in Redmond, Wash. Core installer 214 may include custom action 218. Core installer 214 is deployed by installer deployment module 210 during product deployment to client 202. Custom action 218 leverages the privileges of core installer 214 to install satellite installer(s) 216 when client 202 is in a lockdown mode.

Figure 3:
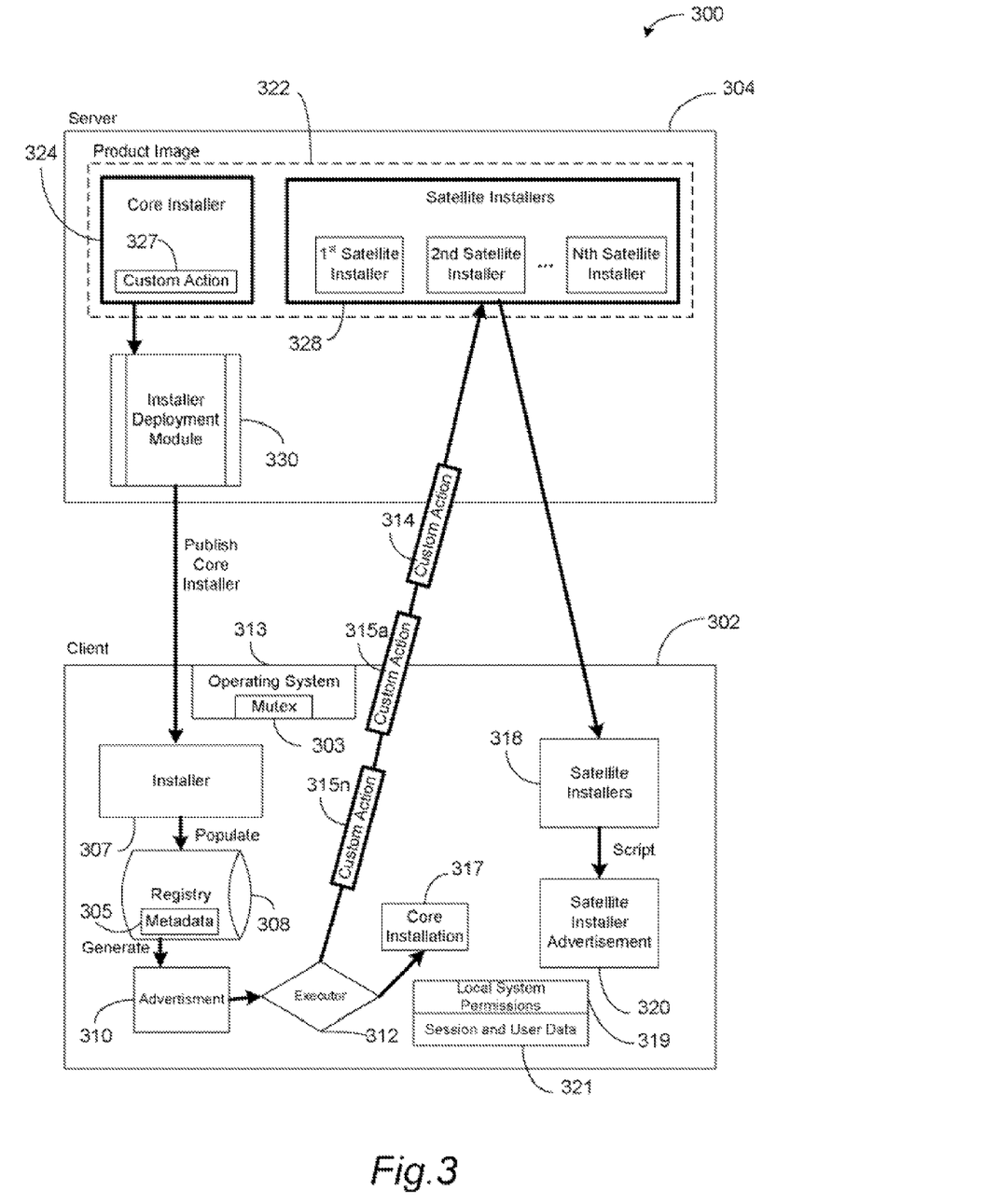
FIG. 3 represents one exemplary system overview for facilitating a multi-installer product installation.

FIG. 3 represents one exemplary system overview for facilitating installation of a multi-installer product. System 300 represents a modular overview of client 302 and server 304. System 300 may be integrated as a combination of software and hardware elements, an operating system or any combination thereof. Hardware, databases, software, applications, and/or programs referenced herein may be integrated as a single element or include various elements in communication with one another. Software and/or hardware elements are depicted herein for explanatory purposes only and not for limiting the configuration to multiple elements or a single element performing several functions unless specifically specified herein. For instance, the product image 322 and the installer deployment module 330 may reside on a file share or another client computer in the network instead of on the server 304.

As depicted in FIG. 3, system 300 includes client 302 having installer 307, registry 308 with metadata 305, advertisement 310, executor 312, custom action 314, spawned custom actions 315a-315n, core installation 317, satellite installers 318, satellite installer advertisement 320, local system permissions 319, operating system 313 having a mutex 303, and session and user data 321. Reference numbers 303-321 may include separate programs, separate databases and separate hardware. Reference numbers 303-321 may also include a single program or any combination of single and multiple programs. Similarly, system 300 includes server 304 having product image 322, core installer 324, custom action 327, satellite installers 328, and installer deployment module 330. Reference numbers 322-330 may include separate programs, separate databases and separate hardware. Reference numbers 322-330 may also include a single program or any combination of single and multiple programs.

Server 304 may be associated with product image 322. Product image 322 is a product image for a multi-installer product. Product image 322 includes core installer 324 and satellite installers 328. Core installer 324 includes the binary application bits for the product. For example, if product image 322 is a product image for "MICROSOFT OFFICE", core installer 324 may include the binary bits for "MICROSOFT WORD", "MICROSOFT EXCEL", "MICROSOFT OUTLOOK", "MICROSOFT POWERPOINT", and/or "MICROSOFT ACCESS". Core installer 324 also includes custom action 327. As is more fully set forth below, system action 327 leverages privileges of core installer 324 to facilitate the advertisement and/or installation of satellite installers 328 on client 302.

Product image 322 also includes satellite installers 328. Satellite installers 328 may include any number of installers. In one aspect, satellite installers 328 include resource installers associated with core installer 324. Resource installers may include language resources, language resources from proofing, and/or any other type of resource associated with a language or geographic area. Satellite installers may pregenerate advertised scripts embedded therein. Core installer 324 and satellite installers 328 are separate installers that are associated with product image 322.

Installer deployment module 330 is a single installer deployment module. In one aspect, installer deployment module 330 includes MICROSOFT ACTIVE DIRECTORY. Installer Deployment module 330 publishes/assigns core installer 324 on client 302. To publish/assign one installer 324, installer deployment module 330 may generate a script and publish the script to client 302.

Client 302 receives the script. The script includes custom action 327. Installer 307 populates registry 308 with data from the script to generate advertisement 310. Advertisement 310 is an indicator that a software product is ready for installation on client 302. Executor 312 may include an icon and/or a button that a user actuates to begin an install. In another aspect, executor 312 is a boot process that begins an install. In either situation, core installer 324 is installed to client 302 and custom action 327 associated with core installer 324 is executed. Because single deployment installers do one installation action on a machine at a time, multi-installer programs need multiple installation actions to occur sequentially. Embodiment of the invention provide a facility for multiple installation actions to occur sequentially.

For instance, each installation associated with one of the installers of the multi-installer program is associated with the mutex 303 during installation. The mutex 303 is obtained during installation of core installer 324 and is returned upon completion of the core installation. A mutex is an atomic item of which there can only be one. Use of the mutex 303 for each segment of installing the multi-installer program ensures that each segment is installed sequentially and completes successfully within a single installation session. Once an installation segment is complete, metadata 305 indicating such completion is written to the registry 308.

Custom action 327 executed on client 302 as custom action 314 spawns other custom actions 315a-315n that leverage privileges or permissions 319 of core installer 324 to access satellite installers 328. The other custom actions 315a-315n include code for verifying when installation conditions are met in order to install a next installer and impersonating a user of client 302 or a client machine account as defined by session and user data 321. As is more fully set forth below, custom action 327 includes code for identifying that a product includes multiple installers and that core installer 324 has been cached. Custom action 314 determines the product source and enumerates a list of satellite installers associated with product image 322. Satellite installers 328 are associated with client 302. Pre-generated scripts of satellite installers 328 are accessed and the scripts are applied to client 302 to facilitate satellite installer advertisement 310. To the end user, the installation process is seamless, as if, the product image includes a single installer. Additional details regarding facilitating installation of a multi-installer product will be described below with respect to FIG. 5.

Figure 4:
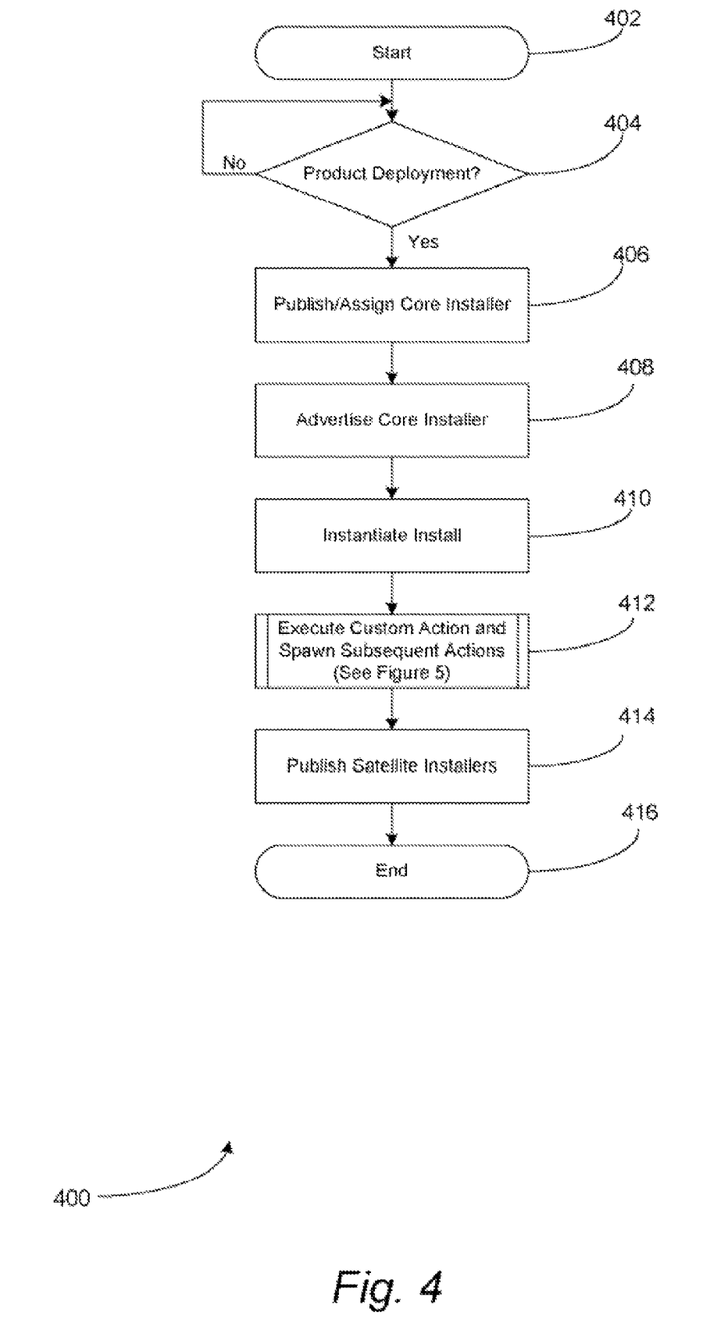
FIG. 4 represents an operational flow diagram for installation via a main global installer of a multi-installer product.

FIG. 4 represents an operational flow diagram for deploying and installing a multi-installer product. Operational flow 400 begins at start operation 402 and flows to decision operation 404. At decision operation 404 it is decided whether to issue a product deployment action. In one aspect, product deployment occurs when an administrator decides to distribute new and/or updated software products on a system of client devices. For example, a network administrator may decide to update client devices with MICROSOFT OFFICE 12. In one aspect, the product deployment is associated with a multi-installer software product.

Where product deployment is not desired, operational flow 400 loops back and waits for a product deployment action. Where product deployment is desired, operational flow 400 continues to operation 406. At operation 406, the core installer of a multi-installer software product is published/assigned. In one aspect, a software development technology such as MICROSOFT ACTIVE DIRECTORY publishes the core installer to a client. Although not necessary, operational flow 400 may continue to operation 408 where the core installer is advertised. The core installer is advertised when the software deployment technology publishes the core installer to the client. The advertisement may include a displayed entry point or link where an install may be manually instantiated. In one respect the advertisement is not generated when the core installer is assigned to a client. When assigned, a boot process may automatically instantiate an install process.

Operational flow 400 continues to operation 410. Operation 410 includes instantiating an install. As stated above and install may be instantiated by selecting an entry point or running a boot process. Operational flow 400 continues to operation 412 where the custom action is executed. The custom action is a program that is associated with the core installer that leverages the privileges of the core installer when published/assigned. The custom action leverages the privileges of the core installer to access, advertise, and facilitate installation of satellite installers, for example when the client device has restricted privileges for users. For custom actions with logic to handle per-user tasks, impersonation of the target user may be used to ensure that the result of the custom action task is effectively and correctly applied to the user's profile. The user's profile is then loaded after the impersonation. Operation 412 is more fully explained below in reference to FIG. 5.

Operational flow 400 continues to operation 414 where the satellite installers are published/assigned to the client device or apparatus. To the end user, the functions of the custom action create an advertisement and install process as if the software product included a single installer. The advertised satellite installers may be installed by actuating an entry point or a boot process. Operational flow continues to end operation 416.

Figure 5:
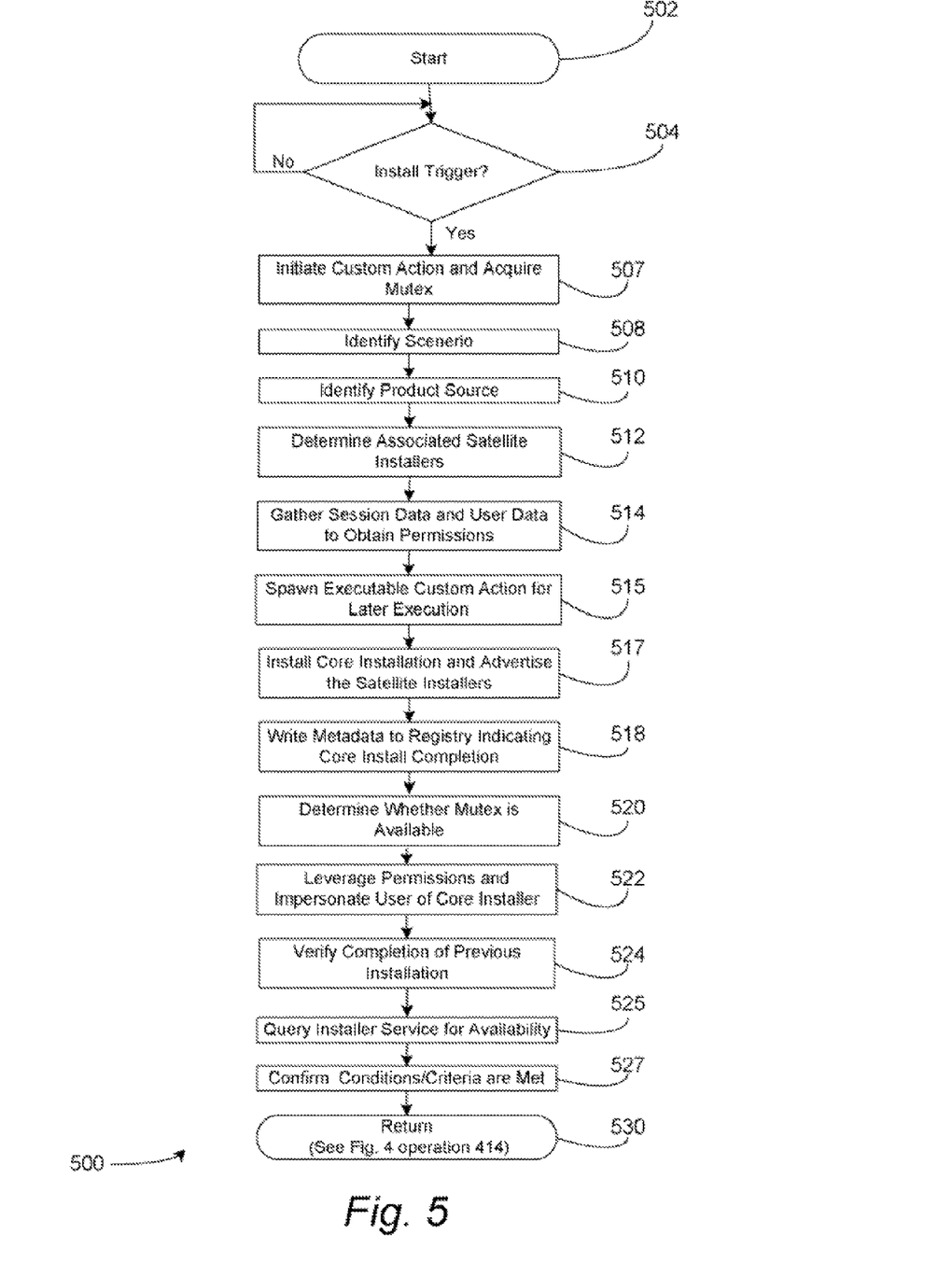
FIG. 5 represents an operational flow diagram for facilitating multi-installer product installation via one or more add-on or satellite installers.

FIG. 5 represents an operational flow diagram for facilitating multi-installer program installation in a local system context with single installer deployment. Operational flow 500 begins at start operation 502 and continues to decision operation 504. At decision operation 504, it is decided whether an install trigger has been actuated. As previously stated, an install trigger may be actuated by a user actuating an entry point. An install trigger may also be actuated by a boot operation. When an install trigger is actuated, operational flow 500 continues to operation 507. The custom action that is associated with the core installer is actuated or initiated when the install trigger is actuated. An installer mutex is also acquired by the custom action at operation 507 to facilitate sequencing of the installation process.

In executing the custom action, operation flow 500 continues to operation 508 where the scenario is identified. The custom action includes code to identify that the core installer has been cached. The custom action also includes code to identify that more installers are needed for a complete installation. When the scenario is identified, operational flow 500 continues to operation 510.

At operation 510, the software product source is identified. The custom action includes cod to determine the source of the core installer. In finding the source, the custom action may associate an address with a location and/or find the source via an identifier. Operational flow 500 continues to operation 512 where the associated satellite installers are determined. When returning to the source, the custom action scans the source to determine if satellite installers are associated with the core installer. In determining associated satellite installers a list of satellite installers that are associated with the core installer may be generated. The multi-installer program may include the core installer and one or more satellite installers.

Operational flow 500 continues to operation 514 where data associated with the local system on which the multi-installer program is to be installed is gathered to obtain elevated privileges/permissions. This data may be retrieved from local system permissions or session and user data residing on the client or target computer housing the local system. The data may include a session identifier, a username, and/or a user domain associated with a machine account or a user currently logged in to the target computer. Operational flow 500 then continues to operation 515 where one or more executable custom actions or installation processes are spawned from the custom action installer process for later execution to facilitate installation of the satellite installer(s). The separate spawned processes wait until the installer mutex is returned, and the installation being driven by that original custom action process is complete. The spawned processes also inherit the same elevated privileges/permissions as the core installer.

At operation 517 core installer custom action continues the installation of the main product core installation file. At the end of that installation at operation 518, the core installer custom action writes out specially configured metadata (as defined in the core product installer) to the target computer. This metadata indicates completion of the core installation and may include metadata indicating advertisement of the satellite installer(s).

Meanwhile, at operation 520, the spawned custom action waits idle, periodically querying an installer service application program interface (API) to see if the installer mutex has been released/returned. At operation 522, the spawned custom action may leverage the permissions inherited from the core installer to impersonate a user of the target computer. Impersonating a target user may include collecting the session identifier, username, and/or user domain of the target user, retrieving an access token associated with the session identifier: and impersonating the access token. Impersonating may also include comparing the username and the user domain to a username and a username of the impersonated access token for validation therein executing in a security context of the target user.

At operation 524, when the mutex is released, the spawned process may begin querying the target computer for the specially configured metadata which was written to indicate that the main or core product installer installation is completed. The spawned custom action may determine whether the metadata indicating completion of the core installation is present in the registry by detecting whether metadata indicating advertisement of the satellite installer on the target computer is present in the registry. At operation 525 the spawned custom action queries the installer service to verify that the installer service is available to complete a next segment of the installation. The spawned custom action may querying the installer service for a list of commands for execution and infer from a command on the list of commands whether the installer service is available.

At operation 530, the spawned custom action may confirm to a target user that installation conditions or criteria are met for installing a next segment of the multi-installer program. Once all of these criteria are met, the spawned process begins the installation and feature configuration of the companion satellite installers which compose the product. When the installation conditions are met, multiple installation actions can be implemented sequentially in a single installer deployment environment. Operational flow 500 returns control to other operational routines at return operation 530.

In this manner, the custom action associated with the core installer leverages the privileges of the core installer to facilitate installation of satellite installers on a client device. The custom action allows multi-installer software products to be installed on a client via a software deployment technology configured for single installer software products. In this manner, multi-installer software products may be easily deployed, advertised, and installed on client devices. Facilitating installation in this manner successfully works around the single instance and permissions limitations of conventional installers and completes the installation and configuration of all of the companion installers which compose the product.

Referring to FIG. 1, an exemplary system for implementing the invention includes a computer device, such as computing device 100. In a basic configuration, computing device 100 may include any type of stationary computing device or a mobile computing device. Computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for multi-installer product deployment. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, to tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included.

Computing device 100 also contains communication connection(s) 116 that allow the device to communicate with other computing devices 118, such as over a network or a wireless network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claimed hereinafter appended.

What is claimed is:

1. A computer-implemented method for facilitating a multi-installer program installation in a single installer deployment environment, the method comprising:
   executing a custom action holding an installer mutex and obtaining installation privileges associated with installing a core installation via a core installer of a multi-installer program wherein the multi-installer program comprises the core installer and at least one satellite installer;
   publishing the core installer, the core installer being advertised upon publication, the advertisement comprising a displayed entry point for a manual instantiation of the multi-installer program installation;
   spawning from within the custom action at least one spawned custom action capable of awaiting execution until the custom action no longer holds the installer mutex wherein the at least one spawned custom action inherits the installation privileges obtained by the custom action;
   executing the at least one spawned custom action to confirm when installation conditions are met for implementing an add-on installation associated with the at least one satellite installer of the multi-installer program wherein the installation conditions include the installer mutex no longer being held and thus available for use, wherein executing the spawned custom action comprises verifying that the installer mutex is available by:
      querying an installer service for a list of commands for execution; and
      inferring from a command on the list of commands whether the installer service is available;
   confirming to a target user of the multi-installer program that the installation conditions are met for implementing an add-on installation;
   wherein when the installation conditions are met, multiple installation actions be are advertised and sequentially installed in a single installer deployment environment configured only for single installer software products, the multiple installation actions comprising an installation of multi-installer software products; and
   impersonating a machine account of a target computer on which the multi-installer program is to be installed and gathering data associated with the target computer, wherein gathering data comprises collecting data associated with the machine account therein utilizing permissions in a security context of the target computer, the security context comprising the target computer having restricted privileges for user installations.

2. The method of claim 1, wherein executing the spawned custom action further comprises at least one of the following:
   verifying completion of installing the core installation; and
   verifying that the installer service is available to complete installing the add-on installation.

3. The method of claim 2, wherein verifying that the installer mutex is available comprises determining whether the mutex is available via a call to a mutex application program interface (API).

4. The method of claim 3, further comprising writing metadata to a registry of a target computer when installation of the core installation on the target computer is complete wherein verifying completion of installing the core installation comprises determining whether the metadata indicating completion of the core installation is present in the registry.

5. The method of claim 4, wherein determining whether the metadata indicating completion of the core installation is present in the registry comprises detecting whether metadata indicating advertisement of the at least one satellite installer on the target computer is present in the registry.

6. The method of claim 1, further comprising:
   gathering data associated with a target computer on which the multi-installer program is to be installed;
   accessing pre-generated scripts associated with the at least one satellite installer; and advertising the at least one satellite installer via the target computer.

7. The method of claim 6, further comprising impersonating the target user of the target computer from within the at least one spawned custom action wherein gathering data associated with the target computer comprises collecting at least one identifier associated with the target user of the target computer.

8. The method of claim 7, wherein impersonating the target user comprises:
 collecting the at least one identifier wherein the at least one identifier comprises a session identifier of the target user;
 retrieving an access token associated with the session identifier; and
 impersonating the access token.

9. The method of claim 8, wherein impersonating the target user further comprises:
 collecting the at least one identifier wherein the at least one identifier comprises a username of the target user and a user domain of the target user; and
 comparing the username and the user domain to a username and a user domain of the impersonated access token for validation therein executing the custom action and the at least one spawned custom action in a security context of the target user.

10. The method of claim 1, wherein the core installer includes application binaries and the at least one satellite installer includes resource strings.

11. A computer-readable storage medium not consisting of a signal, the computer-readable storage medium containing computer executable instructions which, when executed on a computing device, will cause the computing device to perform a method for facilitating installation of a multi-installer program having single installer deployment, the method comprising:
 executing a custom action and obtaining installation privileges associated with installing a core installation via a core installer of a multi-installer program;
 acquiring an installer mutex in association with the custom action for a duration of installing the core installation;
 publishing the core installer, the core installer being advertised upon publication, the advertisement comprising a displayed entry point for a manual instantiation of the multi-installer program installation;
 spawning from within the custom action spawned custom actions capable of waiting until installing of a previous installation is complete before executing;
 executing the spawned custom actions to confirm when installation conditions are met for implementing add-on installations associated with add-on installers of the multi-installer program wherein the installation conditions include the installer mutex no longer being in association with the custom action and thus available for use;
 confirming to a target user of the multi-installer program that the installation conditions are met for implementing the add-on installations, wherein when the installation conditions are met, multiple installation actions are advertised and sequentially installed in a single installer deployment environment configured only for single installer software products, the multiple installation actions comprising an installation of multi-installer software products; and
 impersonating the target user of the computer from within the spawned custom actions to leverage permissions associated with installing the core installation wherein impersonating the target user comprises:
  collecting at least one identifier wherein the at least one identifier comprises at least one of the following:
   a session identifier of the target user;
   a username of the target user; and
   a user domain of the target user;
  retrieving an access token associated with the session identifier;
  impersonating the access token;
  comparing the username and the user domain to a username and a user domain of the impersonated access token for validation therein executing in a security context of the target user, the security context comprising the target user of the computer having restricted privileges for user installations; and
  verifying that the installer mutex is available by:
   querying an installer service for a list of commands for execution; and
   inferring from a command on the list of commands whether the installer service is available.

12. The computer-readable storage medium not consisting of a signal of claim 11, further comprising:
 verifying completion of installing the core installation; and
 verifying that the installer service is available to complete installing the add-on installations.

13. The computer-readable storage medium not consisting of a signal of claim 12, further comprising writing metadata to a registry of the computer when installation of the core installation on the target computer is complete, wherein verifying completion of installing the core installation comprises determining whether the metadata indicating completion of the core installation is present in the registry.

14. A computer-implemented system for facilitating installation of a multi-installer program with a single installer deployment, the system comprising:
 a memory for storing executable program code; and
 a processor, functionally coupled to the memory, the processor being responsive to computer-executable instructions contained in the program code and operative to:
  execute a custom action holding an installer mutex and obtain installation privileges associated with installing a core installation via a core installer of a multi-installer program;
  publish the core installer, the core installer being advertised upon publication, the advertisement comprising a displayed entry point for a manual instantiation of the multi-installer program installation;
  pawn from within the custom action at least one spawned custom action capable of awaiting execution until the custom action no longer holds the installer mutex;
  execute the at least one spawned custom action to confirm when installation conditions are met for implementing add-on installations associated with add-on installers of the multi-installer program wherein the installation conditions include the installer mutex no longer being held and thus available for use;
  confirm to a target user of the multi-installer program that the installation conditions are met for implementing the add-on installations;
  wherein when the installation conditions are met, multiple installation actions are advertised and sequentially installed in a single installer deployment environment configured only for single installer software products, the multiple installation actions comprising an installation of multi-installer software products;
  impersonate a machine account of a target computer on which the multi-installer program is to be installed and gathering data associated with the target computer, wherein gathering data comprises collecting data associated with the machine account therein utilizing permissions in a security context of the target computer, the security context comprising the target computer having restricted privileges for user installations;

determine whether the installer mutex is available by:
querying an installer service for a list of commands for execution; and
inferring from a command on the list of commands whether the installer service is available.

15. The system of claim 14, wherein the processor is further operative to:
determine whether installing the core installation is complete; and
determine whether the installer service is available to complete installing the add-on installations.

16. The system of claim 15, wherein the processor is further operative to populate metadata to a registry of the computer when installation of the core installation on a target computer is complete, wherein the processor, in determining whether installing the core installation is complete is operative to detect whether the metadata indicating completion of the core installation is present in the registry.

17. The method of claim 1, further comprising actuating an install trigger to install the at least one satellite installer of the multi-installer program, the install trigger being actuated by a user-actuated entry point.

18. The method of claim 1, further comprising actuating an install trigger to install the at least one satellite installer of the multi-installer program, the install trigger being actuated by a boot operation on the target computer.

* * * * *